(12) United States Patent
Albert (10) Patent No.: US 9,597,761 B2
(45) Date of Patent: Mar. 21, 2017

(54) MACHINE TOOL COMPRISING A LONGITUDINAL RAIL, A TRANSVERSE ARM, AND A MOTORIZED UNIT

(71) Applicant: Airbus Operations (SAS), Toulouse (FR)

(72) Inventor: Fabien Albert, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 14/956,182

(22) Filed: Dec. 1, 2015

(65) Prior Publication Data

US 2016/0158904 A1 Jun. 9, 2016

(30) Foreign Application Priority Data

Dec. 3, 2014 (FR) ...................................... 14 61847

(51) Int. Cl.
| | |
|---|---|
| *F16M 13/00* | (2006.01) |
| *B23Q 9/00* | (2006.01) |
| *F16B 47/00* | (2006.01) |
| *F16M 13/02* | (2006.01) |

(52) U.S. Cl.
CPC ......... *B23Q 9/0014* (2013.01); *B23Q 9/0007* (2013.01); *B23Q 9/0042* (2013.01); *F16B 47/00* (2013.01); *F16M 13/02* (2013.01); *F16M 2200/025* (2013.01)

(58) Field of Classification Search
CPC ........ B23Q 1/26; B23Q 1/621; B23Q 9/0014; B23Q 9/0007; F16B 47/00; F16M 13/02
USPC ....... 248/550, 637, 646, 674; 173/32, 31, 37
See application file for complete search history.

(56) References Cited

U.S. PATENT DOCUMENTS

| | | | | |
|---|---|---|---|---|
| 5,468,099 | A * | 11/1995 | Wheetley | ................ B23B 39/04 |
| | | | | 180/8.1 |
| 6,843,328 | B2 * | 1/2005 | Boyl-Davis | .............. B23Q 1/26 |
| | | | | 173/31 |
| 7,406,758 | B2 * | 8/2008 | Jones | ................... B23Q 9/0014 |
| | | | | 248/205.5 |
| 2005/0265798 | A1 | 12/2005 | Boyl-Davis et al. | |
| 2010/0122444 | A1 | 5/2010 | Reid et al. | |

(Continued)

FOREIGN PATENT DOCUMENTS

EP 1761360 3/2007

OTHER PUBLICATIONS

French Search Report, Sep. 22, 2015.

*Primary Examiner* — Todd M Epps
(74) *Attorney, Agent, or Firm* — Greer, Burns & Crain, Ltd.

(57) ABSTRACT

A machine tool adapted to perform operations, in particular machining, on the surface of a part of large dimensions. The machine tool comprises a longitudinal rail and a transverse arm orthogonal to the longitudinal rail, fixed at a first end to slide on the longitudinal rail. A second end of the transverse arm is fitted with at least one motorized unit comprising at least one sucker allowing the unit to be held in position on the part during an operation. The unit is motorized and comprises a movement system for crawling over the part parallel to the longitudinal rail. The transverse arm carrying a tool is thus positioned precisely on the part. The unit is articulated relative to the transverse arm around a pivot of axis parallel to said transverse arm, in order to adapt to the curvature of the part along the longitudinal rail.

14 Claims, 7 Drawing Sheets

(56) References Cited

U.S. PATENT DOCUMENTS

2013/0289766 A1   10/2013  Hafenrichter et al.
2015/0096777 A1*   4/2015  Albert .................... B23Q 1/621
                                                    173/184

* cited by examiner

MACHINE TOOL COMPRISING A LONGITUDINAL RAIL, A TRANSVERSE ARM, AND A MOTORIZED UNIT

CROSS-REFERENCES TO RELATED APPLICATIONS

This application claims the benefit of the French patent application No. 1461847 filed on Dec. 3, 2014, the entire disclosures of which are incorporated herein by way of reference.

BACKGROUND OF THE INVENTION

The present invention concerns a machine tool for performance of operations on the surface of a part, in particular of large dimensions, for example the production of drillings on an aircraft fuselage element.

More generally, the invention concerns the field of machine tools used to perform automated or semi-automated operations, typically machining or assembly operations, on parts or structures of large dimensions.

Aircraft fuselages or other aeronautical structures such as wings are manufactured in the known manner by the assembly of rigid, generally metal panels onto a structure. To achieve this, the flat or curved panels are positioned on the structure and joined thereto by riveting, for example. This requires the ability to machine the assembly once the panels are in position, typically in order to produce the drillings necessary for riveting.

These operations may be performed by an operator. The development of large dimension robots able to produce drillings on the complete fuselage is onerous.

In order to perform these drillings or other simple machining operations on large dimension assemblies, rapidly and with precision, devices have nonetheless been developed in order to automate these operations in part.

For example, document EP1761360 presents a machine tool comprising two parallel flexible rails fixed to the structure to be machined. The rails are fixed to the structure using suckers. A machining means, typically a drill, moves between the two rails along a transverse module.

Such a device is however complex to implement in that it comprises two rails which must be perfectly parallel. Also, by construction, the width between the two rails and the surface area which can be reached by the machining tool are limited. Finally, such a device is not suitable for a surface with a significant double curvature because of the difficulty of positioning two rails in parallel on such a surface. A pronounced double curvature exists in certain zones of aeronautical structures, in particular certain fuselages.

SUMMARY OF THE INVENTION

An object of the present invention is to provide an optimized machine tool which resolves at least one of these drawbacks.

To this end, the invention therefore concerns a machine tool for performance of operations on a part, comprising:
 a longitudinal rail configured to be positioned relative to the part;
 a transverse arm orthogonal to the longitudinal rail, comprising a first end mounted in translation on the longitudinal rail;
 a tool carried by the transverse arm;
 at least one motorized unit arranged at a second end of the transverse arm and comprising:
 a movement system for crawling over the part parallel to the longitudinal rail;
 at least one sucker allowing the unit to be held in position on the part;
 a vacuum generator device configured to apply a vacuum to the sucker;
 the motorized unit being articulated relative to the transverse arm around a pivot with axis parallel to said transverse arm.

The machine tool comprises a single longitudinal rail. The rail may be positioned fixedly relative to the part. Such a machine tool is simple to implement as it requires the positioning of a single rail. It is adapted for the performance of operations on a part with a surface of double curvature as it does not require the positioning of two parallel rails, and comprises a motorized unit, the orientation of which relative to the part is adaptable thanks to a pivot of axis parallel to said transverse arm. If the motorized unit is connected to the transverse arm via an intermediate support, the pivot may be positioned between the unit and the support or between the support and the transverse arm. Two pivots may therefore be used.

It is adapted to structures of large dimensions and allows operations over a large surface area. In fact a transverse arm of significant length, for example of the order of 1200 mm, may be used. The good support of the transverse arm is guaranteed by the fixing or permanent position control of its two ends, respectively on the longitudinal rail firstly and on the part by a sucker secondly, when an operation is performed on the part.

According to one embodiment of the invention, the movement system comprises a crawler, a running track of which comprises a plurality of suckers.

Preferably, the machine tool according to this embodiment also comprises a distributor for distributing the vacuum provided by the vacuum generator device to the suckers of the running track of the crawler.

The distributor may, for example, comprise a pulley mounted in rotation on a distribution cylinder, the pulley comprising, on a lateral face, orifices distributed regularly in a circle, the distribution cylinder comprising, on a face in contact with the lateral face of the pulley comprising the orifices, an arcuate groove facing at least one of the orifices of the pulley. The groove with an arcuate form may advantageously extend over an angle between 90° and 180°.

According to another embodiment of the invention, the movement system comprises a motorized roller. In this embodiment, the unit may comprise an outer cover with an open face, around which a peripheral skirt is arranged, the assembly of outer cover and peripheral skirt forming a sucker allowing the unit to be held in position on the part.

The peripheral skirt may, for example, comprise a coating of polytetrafluoroethylene.

According to yet another embodiment of the invention, the movement system comprises at least two motorized elements positioned on either side of the sucker. In this embodiment, the motorized elements are rollers or crawlers.

The machine tool may comprise one or more groups of two suckers, two motorized elements being positioned on either side of each group of two suckers.

In each above-mentioned embodiment, the machine tool may comprise two motorized units distributed on either side of the transverse arm.

The transverse arm may comprise a system for moving the tool in translation along the transverse arm. The tool may, in particular, be selected from: a drill, a milling machine, a tribological probe, a rivet insertion device, a riveting tool, a mastic gun, a paint gun. The transverse arm is advantageously mounted in translation on the longitudinal rail by a module connected rigidly to the transverse arm and mounted in translation on the longitudinal rail.

In one embodiment, the machine tool may comprise a control device arranged so as to synchronize the movement of the unit with the movement of the first end of the transverse arm along the longitudinal rail.

The machine tool may then comprise means for determining the forces generated by the transverse arm on the longitudinal rail, said force determination means being functionally connected to the control device, and the control device being configured to minimize said forces.

The machine tool may comprise a device selected from: a rotation sensor connected to a rotating part of the movement device, a force sensor on the transverse arm and a force sensor on the longitudinal rail, an angle sensor configured to determine the angle between the transverse arm and the longitudinal rail.

The longitudinal rail is advantageously fixed to the part by means of fixing suckers. To this end, the longitudinal rail advantageously comprises fixing suckers.

Further features and advantages of the invention will arise more clearly from the description below.

BRIEF DESCRIPTION OF THE DRAWINGS

In the attached drawings, given as non-limitative examples.

DETAILED DESCRIPTION OF THE PREFERRED EMBODIMENTS

Figure 1:
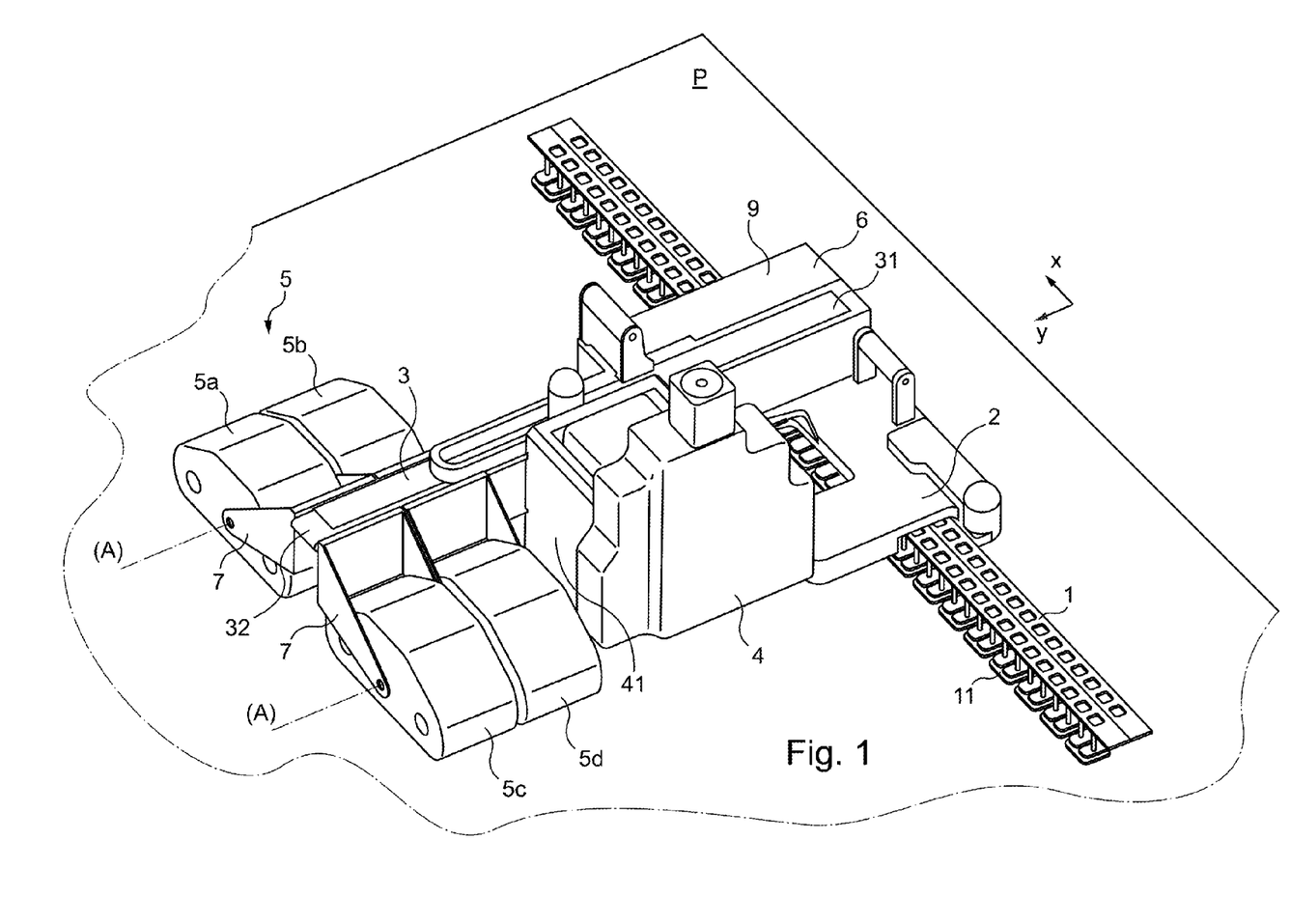
FIG. 1 depicts diagrammatically a machine tool according to one embodiment of the invention and its immediate environment.

A machine tool according to the invention comprises a longitudinal rail 1 as shown on FIG. 1. In one embodiment of the invention, the longitudinal rail 1 comprises fixing suckers 11 allowing fixing to a part P on which operations such as machining are to be performed. Here, the longitudinal rail 1 is flexible and can thus follow the curvature of the part P. A module 2 is mounted on the longitudinal rail 1 and can move in translation thereon. The module 2 may be equipped with a set of rollers clamped to the rail. In addition, the module 2 is advantageously equipped with at least one motor driving its translation on the longitudinal rail 1.

A transverse arm 3 is fixed to the module 2 at a first end 31 of the transverse arm 3. The transverse arm 3 is and remains substantially orthogonal to the longitudinal rail 1. The transverse arm 3 may move in translation along the longitudinal rail 1. In the example shown here, this translation is directly connected to the translation of the module 2 along the longitudinal rail 1. The module 2 may be configured to receive a power unit 9 containing the power electronics of the devices used in the machine tool. In an aeronautical application, the transverse arm may have a length allowing machining over around 1200 mm.

A tool 4, typically a machining tool, is connected to the transverse arm 3. The tool 4 may in practice comprise a module such as a multifunctional platform which connects to the transverse arm 3 via an interface, this module containing at least one working tool (which may for example be a machining tool, a measuring means, a coating application tool). The tool module 4 may also comprise other functions, such as positioning management via a set of inertia sensors providing information on the position of the working tool, or linear or rotational encoders upstream of the final tool. The module containing the working tool thus serves to ensure the mechanical connection of the tool 4 to the transverse arm 3, to provide the energy necessary for the function of the working tool, and to ensure the functionality thanks to various peripherals such as rams, sensors, etc. The tool module 4 may also provide management of the orthogonality of the transverse arm via a system composed of PSD positioning sensors (position sensitive device). In the example shown here, the tool 4 is configured to move in translation along the transverse arm 3. The tool 4 therefore has a sliding connection with the transverse arm 3. The tool 4 may in particular be a machining means as such, or a machining means fixed to a support which is itself connected to the transverse arm 3.

The tool 4 may in particular be a drill or a drilling tool known as an "automatic drilling unit." It may also—for example and without limitation—be a tool for cutting, milling, dimensional control, non-destructive testing (for example ultrasonic), blind hole detection, mastic application, glue application, paint application.

The translation of the tool 4 along the transverse arm 3 may be motorized.

The motors driving the movement of the module 2 along the longitudinal rail and/or that of the tool 4 along the transverse arm 3 may be of the "stepper" type. These are advantageously associated with an electronic control system (not shown) allowing control of their position. Alternatively, the movement of the tool 4 along the transverse arm 3 may also be ensured by a motor acting on an endless screw.

Thus the position of the tool can be controlled very precisely in an orthogonal reference system with an axis parallel to the longitudinal rail (the "X" position) and an axis parallel to the transverse arm (the "Y" position).

Any other device also known in the prior art allowing piloting and control of the position of the tool along these two axes may also be used.

According to different variants of the invention, the tool may also be piloted in orientation in three orthogonal axes of rotation, or in one or two of these three axes.

The transverse arm 3 of the machine tool comprises a unit 5. The unit 5 is fixed to a second end 32 of the transverse arm 3. Depending on the dimensioning of the machine tool, the unit 5 may comprise one or more elementary units. The unit 5 is motorized and more particularly comprises a movement system for crawling over the part P parallel to the longitudinal rail.

In the example shown here, the unit 5 comprises a plurality of elementary units 5a, 5b, 5c and 5d, which are each fixed to the transverse arm 3 via a connecting element 7. Each elementary unit 5a-5d is articulated relative to the transverse arm around a pivot of axis (A) parallel to said transverse arm. Each elementary unit 5a-5d comprises at least one sucker depressurized by a vacuum generating device (not shown). The sucker, which is not visible in FIG. 1, allows the unit 5 to be held in position relative to the part P during an operation on the part P which may generate forces in the transverse arm 4. Each elementary unit 5a-5d is here mounted pivoting on a connecting element 7 which is rigidly connected to the transverse arm 3. The pivot axes (A) are typically parallel to the transverse axis 3 and perpendicular to the longitudinal rail 1, so as to allow the units 5 to be perfectly in contact with the part P even if said part P has a pronounced radius of curvature in the direction of the longitudinal rail 1.

The movement of the motorized unit 5 is advantageously controlled by a control device 6. In the variant of the invention shown here, the control device 6 is connected to the unit 5. The control device 6, according to various embodiments, may have different locations and characteristics. As an alternative to the position connected to the unit 5, the control device 6 may be carried by the module 2 or by any other element of the machine tool. It may be outside the machine tool. The control device 6 may also use the same physical means (computers etc.) as the means controlling the movement of the module 2 on the longitudinal rail 1. Finally, the control data provided by the control device may be transmitted to the unit 5 by hard-wired or wireless means.

A control device 6 aims to synchronize the movement of the motorized units 5 with that of the module 2 along the longitudinal rail 1.

On a flat surface, the movement of the units 5 at any moment must be identical to that of the module 2 along the longitudinal rail 1, in order to ensure an identical and simultaneous movement of these elements. However, when the machine tool is used on a surface with double curvature, for example at the front of an aircraft fuselage, the speed of the unit 5 must be different from the speed of the module 2 in order to ensure that the unit 5 and the module 2 move in a synchronized fashion, although the distances to be covered by the unit 5 and the module 2 are different. The control device 6 allows such management of the movements of the unit 5 and the module 2.

Also, synchronization of the movement of the unit 5 and the module 2 along the longitudinal rail 1 allows more precise positioning of the transverse arm 3.

Finally, the machine tool may be equipped with means for determining the forces generated by the transverse arm at its connection to the longitudinal rail, in combination with the control device 6. These may typically be stress gauges or sensors allowing determination of the torque in the connection between the longitudinal rail 1 and the transverse arm 3.

The force determination means are functionally connected to the control device 6. The control device 6 therefore receives the sensor measurements, and as a function of these measurements controls the movement of the unit 5 by its motorization, so as to minimize the forces generated by the transverse arm at its connection to the longitudinal rail.

In general, the machine tool may comprise a set of geometric control means (not shown) allowing identification of deformations (flexion, torsion) liable to affect the precision of positioning of the tool 4, and to correct this positioning via a correction loop.

In particular, the movement of the unit 5 and hence of the second end 32 of the transverse arm 3 may be controlled by various alternative or complementary devices. A rotation sensor may be used to detect and control the rotational position of a roller or pulley of a crawler of the movement system of the unit 5. The rotation sensor may be positioned on any rotating part of the movement system: roller, crawler pulley, pinion, driveshaft etc. A force sensor may be arranged on the transverse arm 3 together with another force sensor positioned on the longitudinal rail, allowing determination of the difference between forces measured by these two sensors. An angular position sensor may be positioned at the connection between the transverse arm 3 and the longitudinal rail 1 in order to measure the angle formed between the longitudinal rail 1 and the transverse arm 3, and where applicable the angular difference relative to the theoretical 90° between the longitudinal rail 1 and the transverse arm 3.

In general, the sensor or sensors used are connected to a computer unit allowing comparison of one or more measured values with a predefined threshold, in order to apply any necessary correction to the control of the movement system of the unit 5.

In the embodiment shown on FIG. 1, the four elementary units are distributed on either side of the transverse arm 3. The use of a plurality of elementary units may offer several advantages: for example it is possible to adapt the holding force exerted on the part to the stresses generated by the machining operations by choosing to install a sufficient number of units, or for example to improve the reliability of the system, wherein the failure of one of the units does not necessarily lead to the failure of the machine tool.

Figure 2:
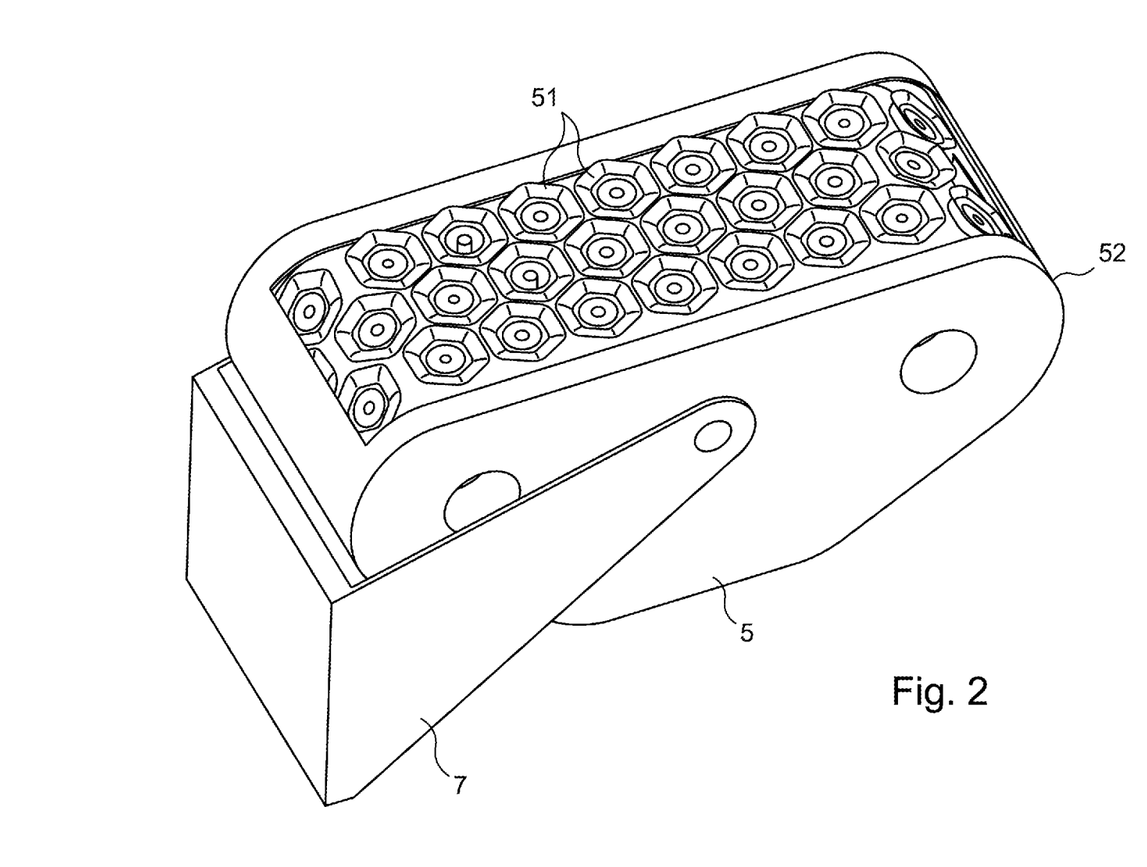
FIG. 2 depicts a detail of a motorized unit as used in a first embodiment of the invention, in a diagrammatic three-dimensional view.

FIG. 2 shows, in a diagrammatic three-dimensional view, a first particular embodiment of a motorized unit 5 which may be used alone or in a set of elementary units according to different variant embodiments of the invention. FIG. 2 also shows a connecting element 7 configured to allow connection between the unit 5 and the transverse arm.

On FIG. 2, the visible face of the unit 5 carrying the sucker 51 corresponds to the face intended to be facing the part P.

The unit 5 is motorized. Motorization of the unit 5 allows control of its movement on the part P parallel to the longitudinal rail 1. The unit 5 shown here comprises a crawler 52 as a movement system. The unit 5 thus motorized is adapted to crawl over the part P parallel to the longitudinal rail 1. In general, a device thus constituted to move slowly or crawl over a surface is usually called a "crawler."

More particularly, the unit 5 comprises a crawler 52, the running track of which comprises several suckers 51. Each sucker 51 is depressurized by a vacuum generating device, or vacuum generating center, through a vacuum supply circuit (not shown).

Figure 3:
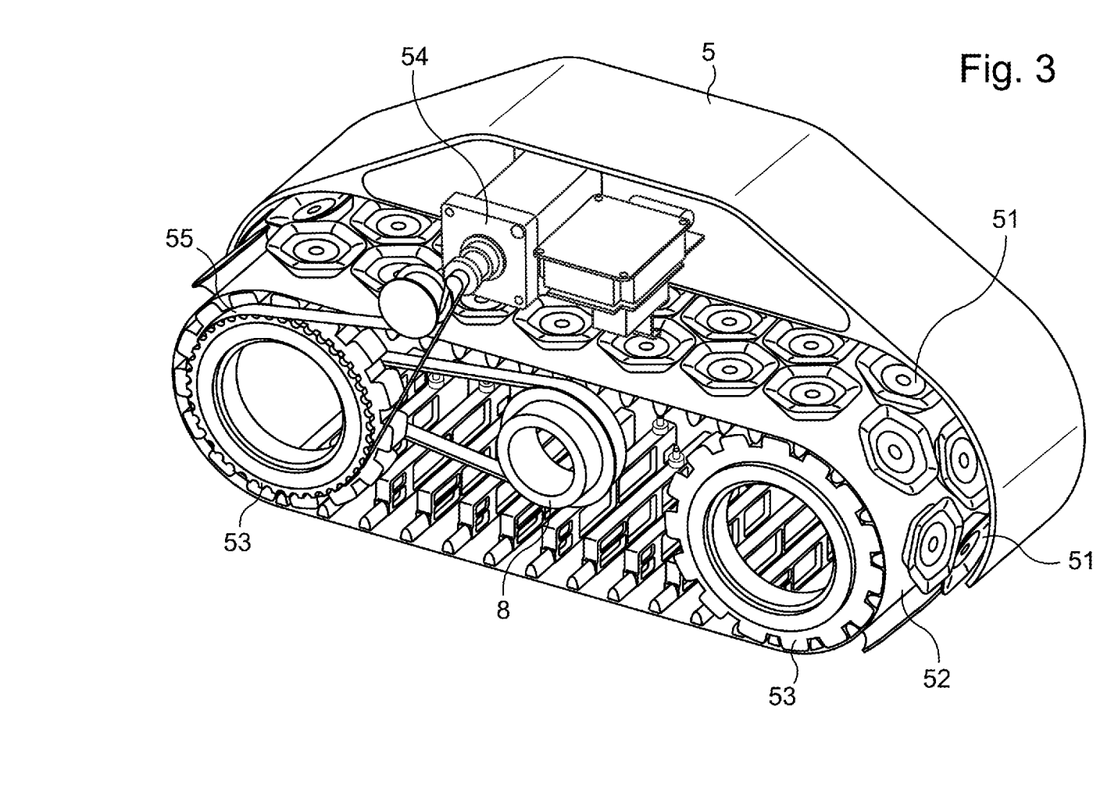
FIG. 3 shows a diagrammatic view of the interior of the unit shown in FIG. 2.

As shown on FIG. 3, which depicts a diagrammatic view of the inside of the unit shown in FIG. 2, the crawler 52 may comprise for example two pulleys 53, at least one of which is a drive pulley i.e. is set in rotation to drive the advance of the track of the crawler 52. The drive pulley or pulleys 53 may be set in rotation via an electric motor 54, an output shaft of which carries a pinion meshing in a notched belt 54 which is itself engaged on the drive pulley or pulleys 53.

The suckers 51 of the track are active, depressurized by a vacuum generating device. The suckers 51 are thus used as a means for holding the unit 5 during machining of the part P, without an additional sucker being required for this function. The unit 5 is thus held against said part by the active suckers which serve as a holding means.

In the first embodiment shown here, the suckers 51 are advantageously depressurized only when in contact with the part P.

As the track of the crawler 52 advances, the suckers 51 which lose contact with the part are no longer under vacuum, while a vacuum is generated in the suckers 51 which newly come into contact with the part.

The vacuum may be distributed to the suckers 51 via a distributor 8 comprising several vacuum outlets, each outlet being connected to one or more suckers, for example by means of flexible hoses or pipes. Typically, an outlet from the distributor 8 may supply several suckers distributed transversely on the running track of the crawler 52.

The distributor 8 is advantageously of the rotating type in this embodiment of the invention, and is synchronized with the movement of the running track of the crawler.

Figure 4:
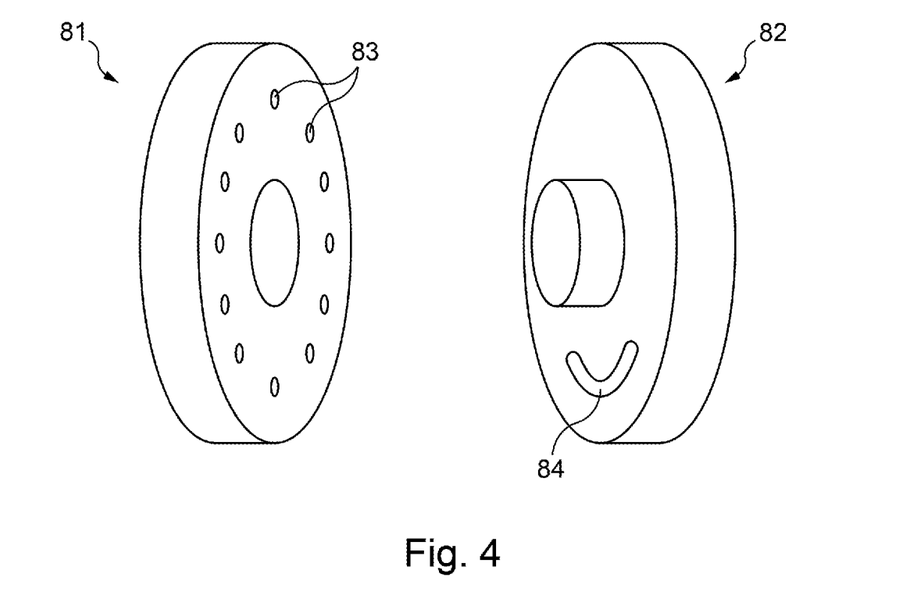
FIG. 4 depicts diagrammatically the main elements of a vacuum distributor which may be used in a unit according to the first embodiment shown in FIGS. 2 and 3.

FIG. 4 shows diagrammatically the main elements of a vacuum distributor 8 according to a variant embodiment.

The distributor may comprise a distribution pulley 81 carrying the air inlets to which the vacuum distribution hoses are connected. The distribution pulley 81 may be driven in rotation by a belt as shown on FIG. 3, said belt being itself connected to another pulley of the crawler or to drive means of the crawler.

The assembly is configured such that the distribution pulley 81 of the rotating distributor 8 performs one complete revolution for each complete revolution of the running track of the crawler 52 (i.e. whenever one point on the running track returns to its initial position).

In order to depressurize only the suckers 51 in contact with the part, the distribution pulley 81 is here mounted in rotation on a distribution cylinder 82. The air inlets for supplying vacuum to the suckers 51 are for example distributed over the outer peripheral surface or a lateral face of the distribution pulley 81. Pipes are provided inside the distribution pulley and for example open onto a lateral face of the distribution pulley in the same number of orifices 83 as air inlets carried by the pulley. The distribution cylinder 82 is fixed and configured to present, facing the orifices of the distribution pulley to be depressurized with vacuum, a recess 84 depressurized by vacuum generating means. The recess 84 may typically take the form of an arc of a circle over 90° to 180°, to depressurize the orifices 83 of the distribution pulley situated over a corresponding circle arc. The orifices 83 which are thus depressurized with vacuum are connected to the suckers which are in contact with the part P at that given moment and which are depressurized with vacuum.

Figure 5:
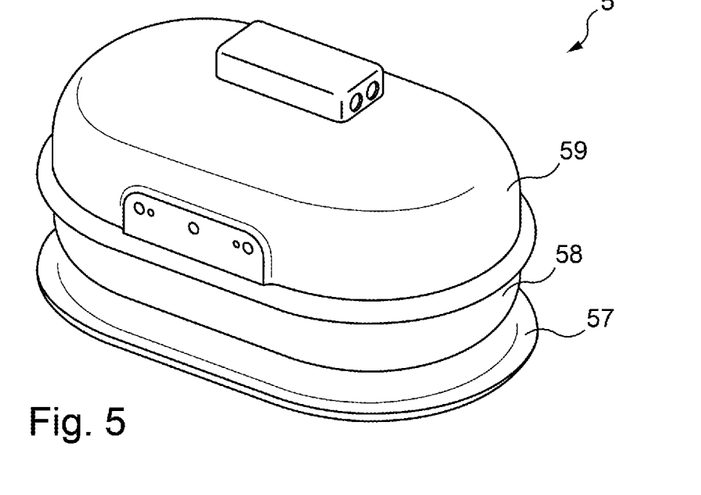
FIG. 5 shows a detail of a motorized unit as used in the second embodiment of the invention, in a diagrammatic three-dimensional view.
Figure 6:
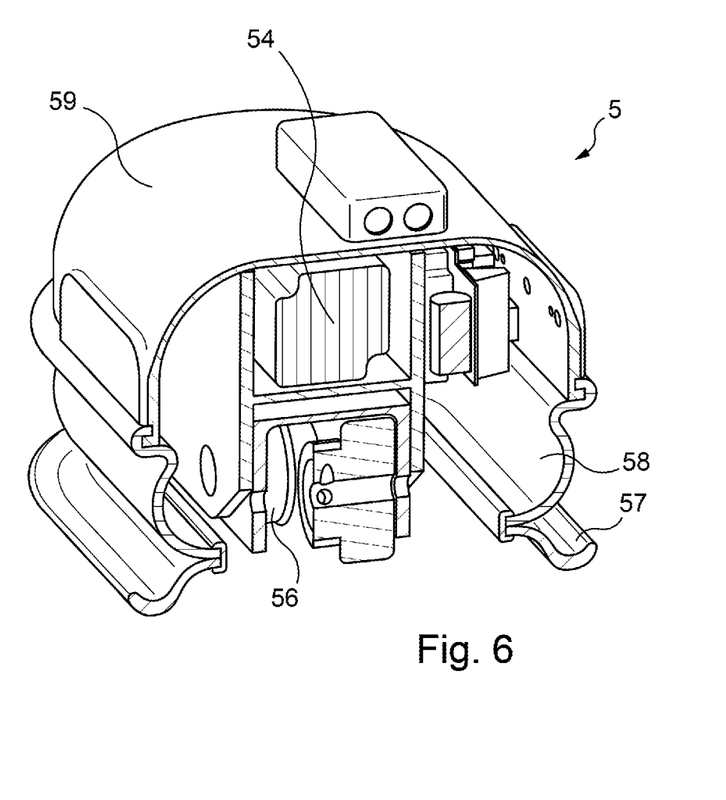
FIG. 6 shows a diagrammatic view of the interior of the unit shown in FIG. 5.

FIG. 5 shows a detail of a motorized unit as used, alone or in a set of elementary units, in a second embodiment of the invention in which the movement system of the unit 5 uses a roller 56. FIG. 6 shows a diagrammatic view of the interior of the unit 5 shown in FIG. 6, with a cross-section view of said unit 5 in FIG. 5.

The unit 5 as a whole behaves as a sucker thanks to a peripheral skirt 57 mounted around an open face of a cover 59 of the unit 5. The peripheral skirt 57 may consist of a flexible material such as rubber or silicone, or of a rigid material such as steel or a rigid plastic material. The skirt 57 advantageously has a low coefficient of friction on the steel, in particular in the zone intended to be in contact with the part P on which the operations are to be performed. Typically, at least this zone of the skirt 57 may have a polytetrafluoroethylene coating (also known as Teflon (registered trademark)).

In the example shown here, the skirt 57 is rigid. The unit 5 also comprises a gusset 58 intended to press the skirt against the part on which the operations are performed such that the unit 5 adapts to the shape variations of this part P.

Figure 7:
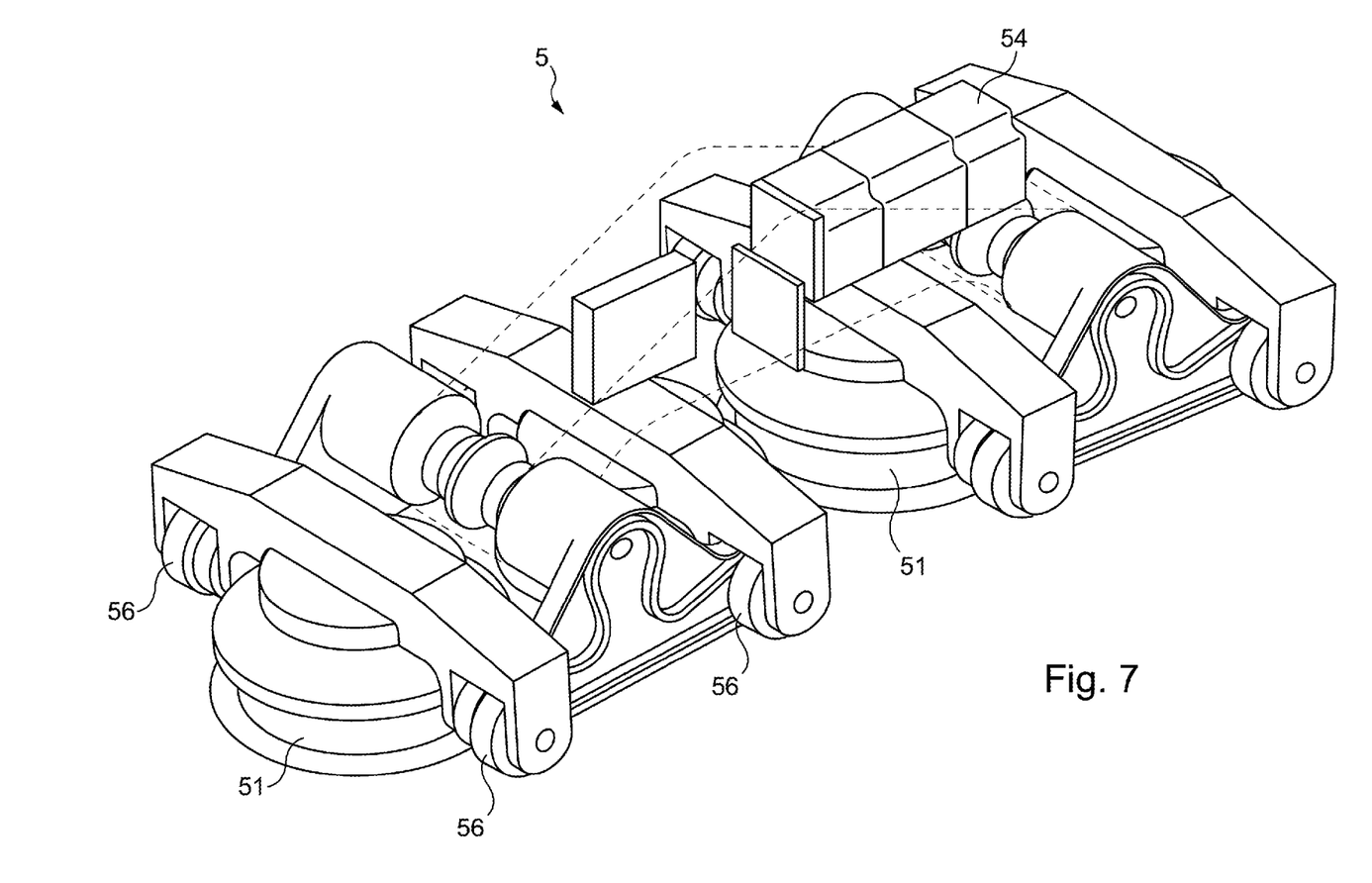
FIG. 7 shows a detail of a motorized unit as used in a third embodiment of the invention, in a diagrammatic three-dimensional view.

According to the exemplary embodiment shown in FIGS. 6 and 7, the unit 5 comprises a structure inside the cover 59, within which a reduced pressure may be established such that the unit 5 as a whole forms a sucker. The internal structure of the unit 5 carries one or more rollers 56. The rollers 56 may advantageously have a high coefficient of friction on the steel. They may be produced in particular of a rubbery material. The rollers 56 are permanently held against the part on which the operations are performed. One or more rollers 56 are driven in rotation by an electric motor 54, an output shaft of which carries a drive pinion. The pinion carried by the electric motor 54 is connected to a transmission device which may comprise a notched belt or a pinion cascade. The friction forces between the rollers 56 and the part on which they roll allow the unit 5 to move over said part.

One or more motorized units 5 according to the embodiment shown in FIGS. 5 and 6 may be mounted on the second end 32 of the transverse arm 3. In particular, two motorized units may be used.

FIG. 7 shows a detail of a motorized unit as used in a third embodiment of the invention. In this third embodiment, the movement system comprises at least two motorized elements positioned on either side of a sucker 51. In the variant shown here, the motorized elements are rollers 56. In another variant not shown, the rollers 56 are replaced by crawlers.

In this embodiment, the unit 5 may comprise one or more groups of two suckers, two motorized elements being positioned on either side of each group of two suckers.

In the variant shown here of the third embodiment, the unit 5 comprises eight rollers 56 arranged in pairs on either side of four suckers. According to variants (not shown) of this embodiment, the unit 5 may comprise two, four, six, ten or twelve rollers. The suckers are made of a material with a low coefficient of friction on the material of the surface of the part P (for example carbon-fiber-reinforced polymer (CFRP) or aluminum, with or without a lacquer type protective coating), or have a coating with a low coefficient of friction on the material of the surface of the part on which the operations are performed. For example Teflon (registered trademark) may be used. The vacuum generating device allows the depressurization with vacuum to the sucker or suckers 51, or where applicable to one sucker or certain suckers only of the unit 5.

The rollers 56 may advantageously have a high coefficient of friction on the material of the surface of the part on which the operations are performed. They may be made in particular of a rubbery material. The rollers 56 are permanently held against the part on which the operations are performed. One or more rollers are driven in rotation by means of an electric motor 54, an output shaft of which carries a drive pinion. The pinion carried by the electric motor 54 is connected to a transmission device which may comprise a toothed belt or a pinion cascade. The friction forces between the rollers 56 and the part on which they roll allow the movement of the unit 5 on said part.

In this third embodiment, as in the two embodiments described above, a plurality of units 5 may be used.

Figure 8:
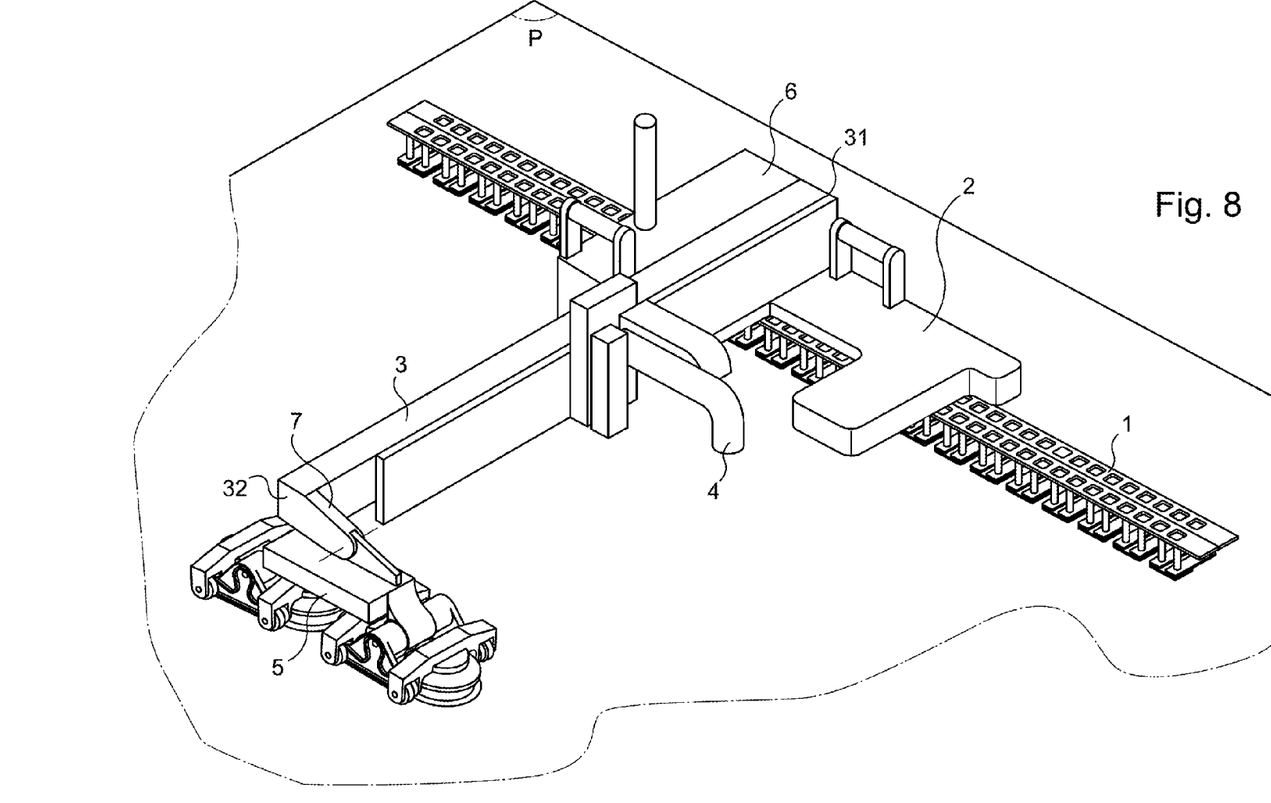
FIG. 8 depicts diagrammatically a machine tool according to an embodiment of the invention using the motorized unit of FIG. 7, and its immediate environment.

FIG. 8 shows diagrammatically a machine tool according to one embodiment of the invention using the motorized unit of FIG. 7, and its immediate environment. In this embodiment, the machine tool has a same general architecture as a machine tool FIG. 1, from which it differs essentially in the unit 5 used. The machine tool in particular comprises a longitudinal rail 1, shown on FIG. 8, fixed to a part P on which operations, for example machining, are to be performed. A module 2 is mounted on the longitudinal rail 1 and may move in translation thereon. A transverse arm 3, orthogonal to the longitudinal rail 1, is fixed to the module 2 at a first end 31. The transverse arm 3 can move in translation along the longitudinal rail 1.

A tool 4 is connected to the transverse arm 3 via a module. In the example shown here, the tool 4 is configured to move in translation along the transverse arm 3. The transverse arm 3 of the machine tool comprises a motorized unit 5 according to the embodiment shown on FIG. 7. The unit 5 is fixed to a second end 32 of the transverse arm 3. It is controlled by the control device 6.

In all embodiments of the motorized unit 5 described above, and in particular in the second and third embodiments, it may be advantageous to vary the force generated by the holding means. Thus it may be advantageous to vary the vacuum in the suckers. For example, when the part on which the operations are performed resembles a horizontal cylinder, as may be the case for an aircraft fuselage, the force of gravity exerted on the unit 5 tries to detach this from the part when the operation is performed in the lower portion thereof, whereas it tries to press said unit onto the part when an operation is performed on the upper portion thereof. Typically, the unit 5 may comprise an accelerometer and/or inertia sensors configured to allow determination of its position and/or orientation, in order to guarantee a uniform behavior of the machine tool irrespective of its orientation.

In all embodiments of the invention, the vacuum generating device may be common to the depressurization of the suckers 51 and the fixing suckers 11.

Naturally, other embodiments or variants of the machine tool may be considered without leaving scope of the invention.

In particular, other means for fixing the longitudinal rail 1 to the part P may be used, for example magnetic means.

In another variant of the invention, the longitudinal rail 1 does not comprise any means of direct fixing to the part to be machined. In this variant, the longitudinal rail 1 is not placed on the part P or in contact therewith, but forms part of a surrounding installation or "workstation." The longitudinal rail 1 is then positioned fixedly relative to the part by immobilization of the part P relative to the workstation.

The machine tool thus developed allows the performance of automated or semi-automated operations, in particular simple machining operations, on the surface of a part of large dimensions which may be curved, such as for example an aircraft fuselage element. Since a single rail need be positioned as a longitudinal reference on the part, in the embodiment considered here, the machine tool developed may be adapted to structures with a double curvature. It is also easy to install such that typically a single operator is sufficient for its use. It allows the performance of operations such as machining on a large surface area, thanks to the great length of the arm. This is possible thanks to the immobilization or permanent position control of the two ends of the arm during operations performed on the part, which is achieved by the use of a motorized unit comprising a movement system for crawling over the part on which the operations are performed, and at least one sucker for holding it in position on said part. The machine tool developed is also easy to reconfigure and may receive many types of tools, allowing many types of machining, assembly or control.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A machine tool for performance of operations on a part, comprising:
a longitudinal rail configured to be positioned relative to the part;
a transverse arm orthogonal to the longitudinal rail, comprising a first end mounted in translation on the longitudinal rail;
a tool carried by the transverse arm;
at least one motorized unit arranged at a second end of the transverse arm and comprising:
a movement system for crawling over the part parallel to the longitudinal rail;
at least one sucker allowing the unit to be held in position on the part;
a vacuum generator device configured to apply a vacuum to the sucker;
the motorized unit being articulated relative to the transverse arm around a pivot with axis parallel to said transverse arm.

2. The machine tool according to claim 1, the movement system of which comprises a crawler, a running track of which comprises a plurality of second suckers.

3. The machine tool according to claim 2, further comprising a distributor for distributing the vacuum provided by the vacuum generator device to the second suckers of the running track of the crawler.

4. The machine tool according to claim 3, wherein the distributor comprises a pulley mounted in rotation on a distribution cylinder, the pulley comprising, on a lateral face, orifices distributed regularly in a circle, the distribution cylinder comprising, on a face in contact with the lateral face of the pulley comprising the orifices, an arcuate groove facing at least one of the orifices of the pulley.

5. The machine tool according to claim 4, wherein the groove with an arcuate form extends over an angle between 90° and 180°.

6. The machine tool according to claim 1, wherein the movement system comprises a motorized roller.

7. The machine tool according to claim 6, wherein the unit comprises an outer cover with an open face, around which a peripheral skirt is arranged, the assembly of outer cover and peripheral skirt forming a sucker allowing the unit to be held in position on the part.

8. The machine tool according to claim 7, wherein the peripheral skirt comprises a coating of polytetrafluoroethylene.

9. The machine tool according to claim 1, wherein the movement system comprises at least two motorized elements positioned on either side of the sucker.

10. The machine tool according to claim 9, wherein the motorized elements are rollers or crawlers.

11. The machine tool according to claim 9, comprising one or more groups of two suckers, two motorized elements being positioned on either side of each group of two suckers.

12. The machine tool according to claim 1, comprising two motorized elementary units distributed on either side of the transverse arm.

13. The machine tool according to claim 1, wherein the transverse arm comprises a system for moving the tool in translation along the transverse arm.

14. The machine tool according to claim 1, further comprising a device selected the group consisting of:
- a rotation sensor connected to a rotating part of the movement device,
- a force sensor on the transverse arm and a force sensor on the longitudinal rail, and
- an angle sensor configured to determine the angle between the transverse arm and the longitudinal rail.

\* \* \* \* \*